(12) United States Patent  (10) Patent No.: US 7,108,289 B1
Holmes, IV et al.  (45) Date of Patent: *Sep. 19, 2006

(54) RESTRAINING GASKET FOR MECHANICAL JOINTS OF PIPES

(75) Inventors: William W. Holmes, IV, Birmingham, AL (US); Daniel A. Copeland, Bessemer, AL (US)

(73) Assignee: United States Pipe and Foundry Company, LLC, Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,586

(22) Filed: Jun. 8, 2000

(51) Int. Cl.
*F16L 17/00* (2006.01)
(52) U.S. Cl. .................................................... 285/104
(58) Field of Classification Search ............... 285/104, 285/105, 321, 231, 232, 374, 322
See application file for complete search history.

(56) References Cited

U.S. PATENT DOCUMENTS

| 784,400 A | 3/1905 | Howe |
|---|---|---|
| 1,818,493 A | 8/1931 | McWane |
| 1,930,194 A | 10/1933 | Dillon |
| 2,201,372 A | 5/1940 | Miller |
| 2,473,046 A | 6/1949 | Adams, Jr. |
| 2,491,004 A | 12/1949 | Graham |
| 2,508,914 A | 5/1950 | Graham |
| 2,953,398 A | 9/1960 | Haugen |
| 3,400,950 A | 9/1968 | Quebe et al. |
| 3,445,120 A | 5/1969 | Barr |
| 3,582,112 A | 6/1971 | Pico |
| 3,606,402 A | 9/1971 | Medney |
| 3,724,880 A | 4/1973 | Seiler |
| 3,726,549 A | 4/1973 | Bradley |
| 3,731,955 A | 5/1973 | Borsum et al. |
| 3,733,093 A | 5/1973 | Seiler |
| 3,877,733 A | 4/1975 | Straub |
| 3,963,298 A | 6/1976 | Seiler |
| 4,119,333 A | 10/1978 | Straub |
| 4,119,335 A | 10/1978 | Rieffle |
| 4,229,026 A | 10/1980 | Seiler |
| 4,396,210 A | 8/1983 | Spencer |
| 4,428,604 A | 1/1984 | Conner |
| 4,524,505 A | 6/1985 | Conner |
| 4,540,204 A | 9/1985 | Battle |
| 4,602,792 A | 7/1986 | Andrick |
| 4,606,559 A | 8/1986 | Rammelsberg |
| 4,643,466 A | 2/1987 | Conner et al. |
| 4,647,083 A | 3/1987 | Hashimoto |
| 4,660,866 A | 4/1987 | Jones |

(Continued)

FOREIGN PATENT DOCUMENTS

JP 5229625 A * 3/1977

(Continued)

OTHER PUBLICATIONS

U.S. Appl. No. 09/590,586, filed Jun. 8, 2000, Holmes.

(Continued)

*Primary Examiner*—Xuan Lan Nguyen
(74) *Attorney, Agent, or Firm*—Bradley Arant Rose & White LLP

(57) ABSTRACT

A gasket for connecting two lengths of pipe in a standard mechanical joint is disclosed, which gasket maximizes the advantages of both restrained push-on joints as well as mechanical joints, as are known commonly in the art. The invention has application to long-run pipe lengths as well as appurtenances, including fittings and connections. The gasket contains locking members that act to restrain separation upon the instance of any force tending to separate the connected pipe lengths.

7 Claims, 7 Drawing Sheets

U.S. PATENT DOCUMENTS

| | | | |
|---|---|---|---|
| 4,662,656 A | | 5/1987 | Douglas et al. |
| 4,664,426 A | | 5/1987 | Ueki |
| 4,685,708 A | | 8/1987 | Conner et al. |
| 4,789,167 A | | 12/1988 | Housas |
| 4,805,932 A | | 2/1989 | Imhof et al. |
| 4,848,805 A | | 7/1989 | Bucher et al. |
| 4,867,488 A | | 9/1989 | Jones |
| 4,878,698 A | | 11/1989 | Gilchrist |
| 5,024,454 A | | 6/1991 | McGilp |
| 5,037,144 A | | 8/1991 | Peting |
| 5,058,907 A | | 10/1991 | Percebois |
| 5,067,751 A | | 11/1991 | Walworth et al. |
| 5,094,467 A | | 3/1992 | Lagabe |
| 5,150,929 A | * | 9/1992 | Greatorex .................. 285/231 |
| 5,176,413 A | | 1/1993 | Westman |
| 5,197,768 A | * | 3/1993 | Conner ...................... 285/105 |
| 5,219,189 A | | 6/1993 | Demolsson |
| 5,269,569 A | * | 12/1993 | Weber et al. ............... 285/104 |
| 5,295,697 A | * | 3/1994 | Weber et al. ............... 277/181 |
| 5,297,826 A | | 3/1994 | Percebois |
| 5,328,215 A | | 7/1994 | Grenier |
| 5,332,043 A | * | 7/1994 | Ferguson ................... 166/379 |
| 5,335,946 A | | 8/1994 | Dent |
| 5,340,169 A | | 8/1994 | Hoffmann |
| 5,360,218 A | | 11/1994 | Percebois |
| 5,398,980 A | | 3/1995 | Hunter |
| 5,431,453 A | | 7/1995 | Yamashita |
| 5,464,228 A | | 11/1995 | Weber |
| 5,476,290 A | * | 12/1995 | Bergmann et al. .......... 285/110 |
| 5,476,292 A | * | 12/1995 | Harper ....................... 285/337 |
| 5,496,073 A | | 3/1996 | Grenier |
| 5,603,530 A | | 2/1997 | Guest |
| 5,609,368 A | | 3/1997 | Maki et al. |
| 5,645,285 A | | 7/1997 | Percebois |
| D398,504 S | | 9/1998 | Yamashita |
| 5,803,513 A | | 9/1998 | Richardson |
| 5,897,146 A | | 4/1999 | Saito et al. |
| 5,918,914 A | | 7/1999 | Morris |
| 5,992,905 A | | 11/1999 | Kennedy, Jr. |
| 6,019,396 A | * | 2/2000 | Saito et al. .................... 285/3 |
| 6,062,611 A | | 5/2000 | Percebois |
| 6,168,210 B1 | * | 1/2001 | Bird .......................... 285/337 |
| 6,173,993 B1 | * | 1/2001 | Shumard et al. ............. 285/23 |
| 6,220,635 B1 | | 4/2001 | Vitel et al. |
| 6,299,217 B1 | | 10/2001 | Saito et al. |
| 6,502,865 B1 | | 1/2003 | Steele |
| 6,502,867 B1 | | 1/2003 | Holmes |
| 6,568,658 B1 | | 5/2003 | Strome |
| 6,688,652 B1 | | 2/2004 | Holmes |
| 6,921,114 B1 | | 7/2005 | Washburn et al. |
| 2002/0158466 A1 | | 10/2002 | Jones |
| 2004/0155458 A1 | | 8/2004 | Holmes |
| 2005/0006855 A1 | | 1/2005 | Holmes |
| 2005/0067836 A1 | | 3/2005 | Copeland |

FOREIGN PATENT DOCUMENTS

| | | |
|---|---|---|
| WO | WO 01/13023 | 2/2001 |
| WO | WO 03/050421 A2 | 6/2003 |
| WO | WO 2005/031174 A2 | 4/2005 |
| WO | WO 2005/047745 A2 | 5/2005 |

OTHER PUBLICATIONS

U.S. Appl. No. 10/774,544, filed Feb. 9, 2004, Holmes.
U.S. Appl. No. 10/841,197, filed May 7, 2004, Holmes.
U.S. Appl. No. 10/950,263, filed Sep. 24, 2004, Copeland.

* cited by examiner

RESTRAINING GASKET FOR MECHANICAL JOINTS OF PIPES

BACKGROUND OF THE INVENTION

1. Field of the Invention

This invention relates generally to connections between lengths of pipe, or between pipes and fittings. More particularly, the invention is directed toward a device and method of connecting two lengths of pipe that maximize the advantages of both restrained push-on joints as well as mechanical joints, as are known commonly in the art. The invention has application to long-run pipe lengths as well as fittings, appurtenances, and connections.

2. Description of Related Art

Due to thrust forces, earth movement, and external mechanical forces exerted on pipes, the industry has focused substantial attention on the problem of maintaining connections between adjacent lengths of pipe after installation. The result of this attention is a library of differing solutions and approaches known in the art. The majority of these solutions can be categorized into either "push-on" joints or "mechanical joints." References to "pipe" made by the inventor with respect to application or use of the present invention shall be understood to include fittings, connections, and any other appurtenances to pipes.

The most common connection device used in the art for connection of straight-run lengths of pipe is a "push-on" pipe/bell configuration. These push-on solutions are exemplified by U.S. Pat. No. 2,953,398, and account for the majority of straight-run pipe connections. In a typical configuration, a spigot end of a pipe slides into a bell end of another pipe past a tightly fitted gasket. No follower ring, stuffing box, or other external compression means is typically present in a push-on joint. Additionally, the typical push-on joint does not include a restraining means, though such means as tie bars, concrete thrust blocks, screws, and additional ring attachments have been employed in some cases to effect restraining to the joints. Advancements in the art have led to innovations and modifications of push-on joints to include restraining means. Examples of such restrained push-on joints include U.S. Pat. Nos. 5,295,697; 5,464,228; and 5,067,751. The securement of the connection in such advancements may be effected by locking segments or wedges within the gasket that engage the spigot. The locking segments are oriented in such a manner as to allow entry of the spigot into the bell, but upon counterforces tending to effect removal of the spigot, the segments pivot toward a biting engagement with the spigot, stopping further removal. The effect is much like a child's "finger lock" toy, the stronger the attempt to remove the pipe, the greater the locking effect exerted by the inserts. These push-on type joints enjoy superior flexibility and resistance to both axial and para-axial separative forces. Meaningful difficulty has been experienced in the industry, however, in applying these connections to fittings, where it may be impracticable to secure the fitting sufficiently to exert the high installation pressures necessary initially to push the spigot into the bell in such configurations.

A "mechanical joint" is a well-known standardized connection device widely employed in the pipe industry. Such a joint fluid seals two lengths of pipe together by compressing a gasket around a spigot and within a bell at the intersection. Mechanical joints are characterized by an outwardly flanged bell of a receiving pipe, into which a spigot of a second pipe is inserted. The bell is adapted to seat a gasket that fits snugly about the circumference of the spigot of the second pipe, and further to receive a supporting compression ring or gland. In assembly, the spigot is fully advanced into the bell and the gasket is firmly seated within the bell and around the spigot. The gland is then forced against the gasket by fastening it securely to the bell flange through such means as fastening bolts tightened under relatively high torque. This configuration typically includes a lip about the inner diameter of the gland that upon securement extends axially within the bell. The configuration of the gland is such that as the lip is forced against the gasket, the gasket becomes compressed under pressures sufficient to deform the gasket. As the gasket is compressed between the bell and the gland, the gasket therefore is squeezed inwards toward and into sealing contact with both the exterior of the inserted pipe section and the interior of the bell. This deformation enhances the sealing effectiveness of the gasket beyond that which can be readily obtained in the absence of compression or high insertion forces The mechanical joint enjoys wide acceptance in the industry, and is the subject of national and international standards such as ANSI/AWWA C111/A21.11-95. Given the industry affinity for such joints and the embedded nature of these standards into specifications, any mechanical joint should conform to these specifications to gain optimal acceptance. Numerous attempts have been made to improve upon the standardized mechanical joint. These attempts are almost uniformly characterized by the inclusion of an additional mechanism or attachment, creating a mechanical connection resistive to separation of the pipes. Such attempts that require modification of the bell or gland (or both) are exemplified by U.S. Pat. No. 784,400 to Howe, which employs locking inserts recessed within the gland; U.S. Pat. No. 1,818,493, to McWane, which discloses a modified gland that relies upon specially modified bolts having toothed cams that both pivot on and bite into the spigot as the bolts are hooked under a modified lip of the bell and forced into grooves in the gland.

Further solutions employ additional restraining devices or teeth interposed between the gasket and the gland, which are driven into the spigot as the gland is tightened. Included among these devices are U.S. Pat. No. 4,664,426 to Ueki; and U.S. Pat. No. 5,297,826, to Percebois, which each require the use of multiple additional locking devices in addition to the standard mechanical joint's simple bell-gasket-gland configuration. U.S. Pat. No. 4,878,698, to Gilchrist, U.S. Pat. No. 5,335,946, to Dent, et al, and U.S. Pat. No. 5,398,946, to Hunter, et al., appear susceptible to, possible early engagement of the biting teeth prior to full seating of the gland. U.S. Pat. No. 5,803,513, to Richardson and others attempt to solve this potential problem by use of sacrificial skid pads to prevent early engagement of the teeth.

Additional solutions employ a bolting assembly attached to (or incorporated into) the bell, which assembly is oriented such that upon tightening of certain specially configured bolts, the bolts or a device actuated thereby are driven into the outer surface of the spigot. These bolting schemes are exemplified by devices sold by EBAA Iron, commonly known in the art under the trademark MEGALUG (Registration No. 1383971) Further examples of this type of solution include U.S. Pat. No. 4,647,083, to Hashimoto, which modifies the standard gland to include bolts that act upon locking wedges when tightened. When a pipe is installed in a ground-bedded environment, it is typically inconvenient to have multiple additional bolting requirements on the underside of the pipe as laid. Such underside boltings increase the cost and time of installation. If, however, the bolt-in locking scheme employs only a few bolt locations, the inward pressure of the bolts may in some conditions tend to deform the cross-sectional profile of the spigot. For example, employment of only three bolt locations in some circumstances may exhibit an undesirable possibility of deforming the spigot into a slightly triangular shape.

It will be noted by those reasonably skilled in the art that each of these configurations also suffers from practical issues, such as the expense of manufacture of additional components and the fact that additional components increase the potential for unacceptable failure.

Furthermore, each of these solutions may be considered a "static" connection. Although pipelines are traditionally considered to be rigid and immobile structures, a truly durable connection must allow for a certain amount of flexibility and "play" at joints. Such accommodation to movement is necessary because the environments in which pipelines lay are not truly static. Thrust forces may create non-longitudinal, or para-axial, loads that tend to drive a pipe length toward an angle from the longitudinal axis of the lengths to either side of such axis. As the pressures of the material being transported within the pipe vary, the forces will similarly vary. Additionally, locations in which pipes are run rarely are as stable as commonly believed. In fact, pipes may be run above ground, in which cases such pipes do not enjoy the benefit of any stability enhancing factors of bedding or trenched installation. Finally, even typical earthbedded pipes must endure shifting due to sedimentation, erosion, compaction, mechanical forces (such as nearby construction), and earth movement (such as earthquakes).

A variation of the push-on joint is evidenced by U.S. Pat. No. 2,201,372, to Miller, which employs a compression snap-ring fitted within a special lip of the bell, in order to exert pressure onto the locking segments and thus drive them into the spigot. Alternatives in Miller similarly drive locking segments into the spigot upon installation. U.S. Pat. No. 3,445,120, to Barr, likewise employs a gasket with stiffening segments completely encased therein that are generally disposed in a frustroconical arrangement. Such segments are stated to give the gasket a resistance to compression along the plane that includes both ends of the segment. When a spigot is subjected to withdrawing forces, the gasket rolls with the movement of the pipe. As the gasket rolls, it is intended to eventually encounter a position in which the stiffened plane needs to compress for further rolling. In optimal conditions, due to the stiffening, the gasket cannot compress and therefore cannot roll further. As the rolling stops, the gasket becomes a static friction-based lock between the spigot and the bell. Notably, among other distinctions, the arrangement taught by Barr remains a rubber-to-pipe frictional connection.

OBJECTS OF THE INVENTION

As suggested by the foregoing discussion, an object of this invention is to provide a gasket interchangeable with standard gaskets of standard mechanical joints which allows for the transformation of the joint into a restrained joint without the need for any reconfiguration or adaptation of the bell, spigot, or gland of the mechanical joint involved.

A further object is to provide a dynamic connection for pipes that does not require high insertion pressures.

A further object of the invention is to provide for a cost effective manner and device of restraining a typically configured pipe joint.

Yet another object of the invention is to provide a restrained connection that can be easily dismantled, if need be.

Other objects and advantages of the present invention will become apparent to those skilled in the art from the following description of the invention.

BRIEF SUMMARY OF THE INVENTION

The present invention may be basically described as a gasket for converting a standard mechanical joint into a restrained mechanical joint without the need for altered configuration of the bell, spigot, or gland of the joint, and without the need for additional fittings or devices. In the practice of the present invention, a standard mechanical joint's bell and gland configuration can be employed to connect a spigot end of one pipe length to the bell end of another pipe length in a restrained relationship, with the restraint based on forces superior to rubber-to-pipe friction.

The present invention employs the concept of the locking segments embedded in the gasket that is used in mechanical joints. This overcomes the chief limitation both of mechanical joints, by overcoming limitations on maximum frictional securement between gasket and spigot; and of push-on joints, by reducing or removing the high insertion pressures required, which pressures may not be practicable to obtain in relation to certain elbows, WYEs, and other fittings.

DETAILED DESCRIPTION OF THE INVENTION

The following is a detailed description of the invention. Those skilled in the art will understand that the specificity provided herein is intended for illustrative purposes with respect to the inventor's most preferred embodiment, and is not to be interpreted as limiting the scope of the invention. References to "pipe" herein shall be understood equally to refer to any pipe length, appurtenance, fitting, or any other connected device or element.

Figure 1:
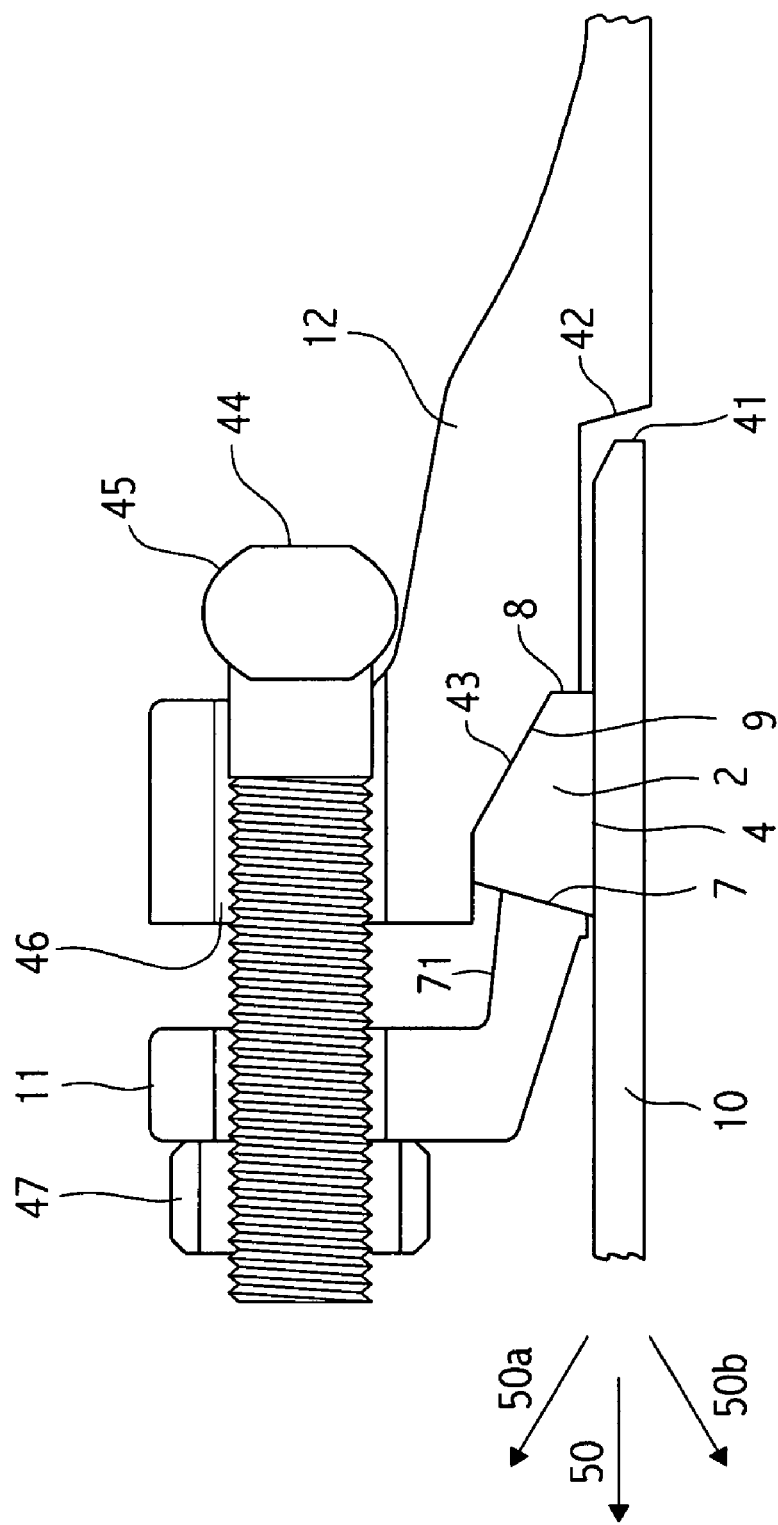
FIG. 1 shows an diagram of the typical mechanical joint, having a gasket in place.

Turning now to the drawings, FIG. 1 presents an exploded diagram of a typical mechanical joint. Assembly of the joint according to the current invention is practiced as known in the art. Particularly, without limitation of the known variants which shall be as equally applicable to the present invention as they are to the known art, the joint contains the following elements in the following relationship. Compression ring or gland 11 is placed on a male first pipe portion, or referred to herein as spigot 10, following which gasket 2 is placed around the exterior of spigot 10. Spigot 10 is then advanced within a female second pipe portion, referred to herein as bell 12, until the end 41 of spigot 10 is stopped by an annular shoulder 42 within bell 12. Gasket 2 is advanced into bell 12 until it seats in the annular gasket recess seat 43, as shown. Gland 11 is then abutted against gasket 2 and is secured to bell 12 by restraining means 44, which are presented for illustration here as bolts 45 passing through perforations 46 and engaged by nuts 47; as is evident, upon drawing up or tightening of nuts 47, gland 11 is compressed against gasket 2, causing it to compress. Due to the constraining presence of gasket recess seat 43 and gland 11, deforming of gasket 2 is directed primarily radially inward toward and into sealing engagement with spigot 10. The invention of the present disclosure builds upon this interrelationship and requires no changes to the spigot, bell, or gland, though such changes may be accommodated within the spirit of the invention if such modifications are otherwise desired.

Figure 2:
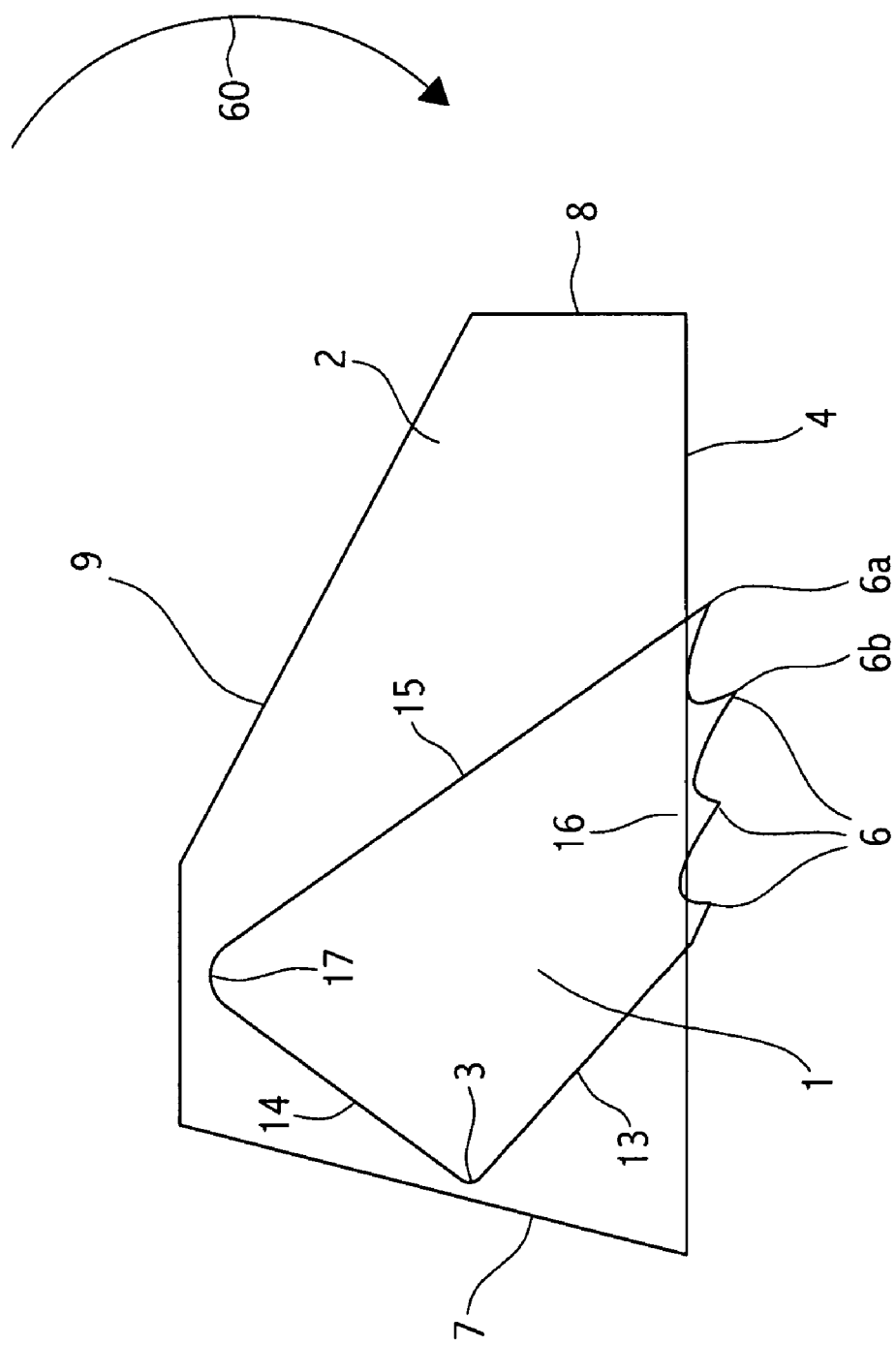
FIG. 2 depicts a cross-sectional view of an un-stressed gasket of the present invention, at a location in which the position and cross-section of the locking segment can be viewed.
Figure 3:
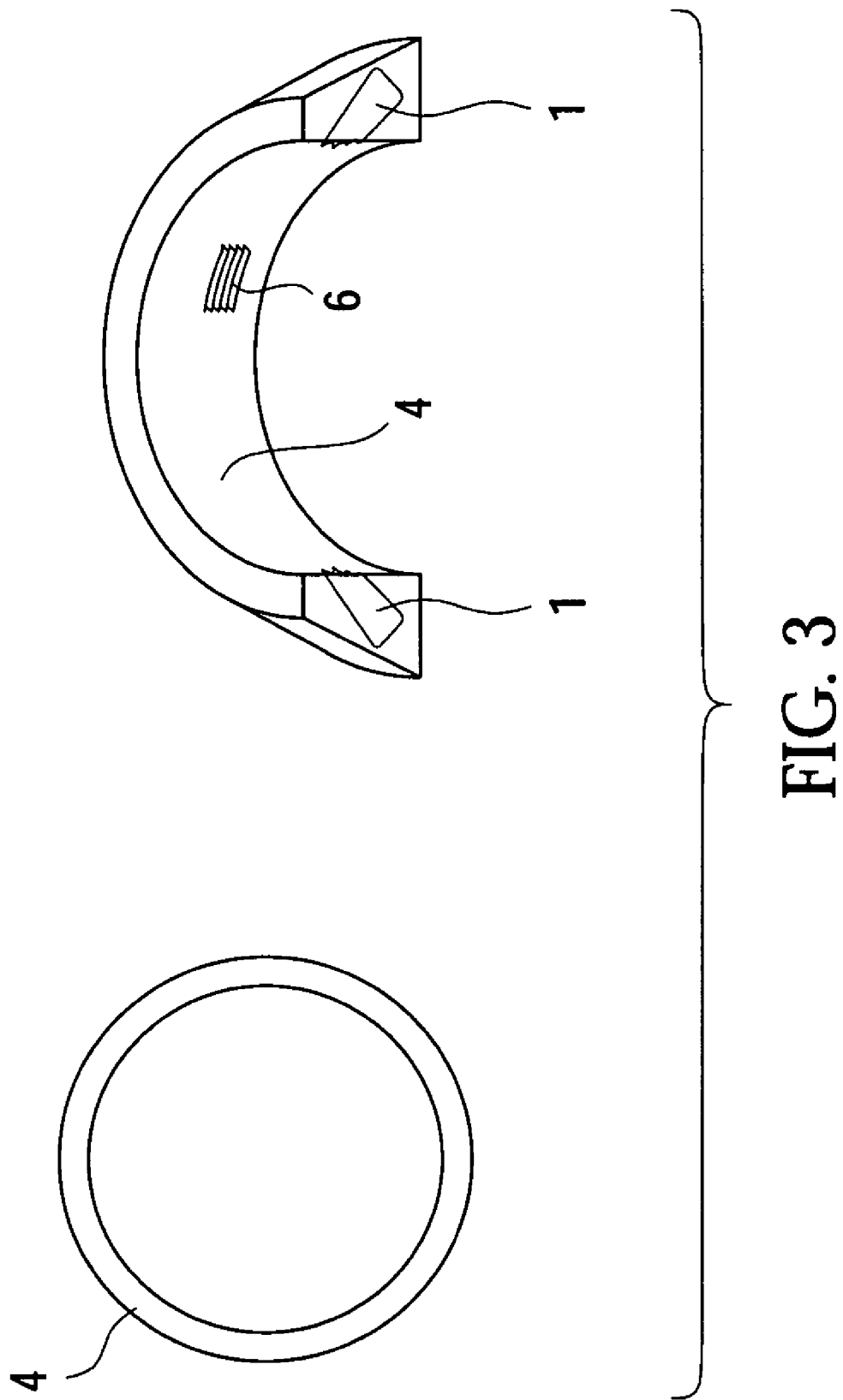
FIG. 3 demonstrates the cross-sectional view and a top view of the gasket as in FIG. 2.
Figure 4:
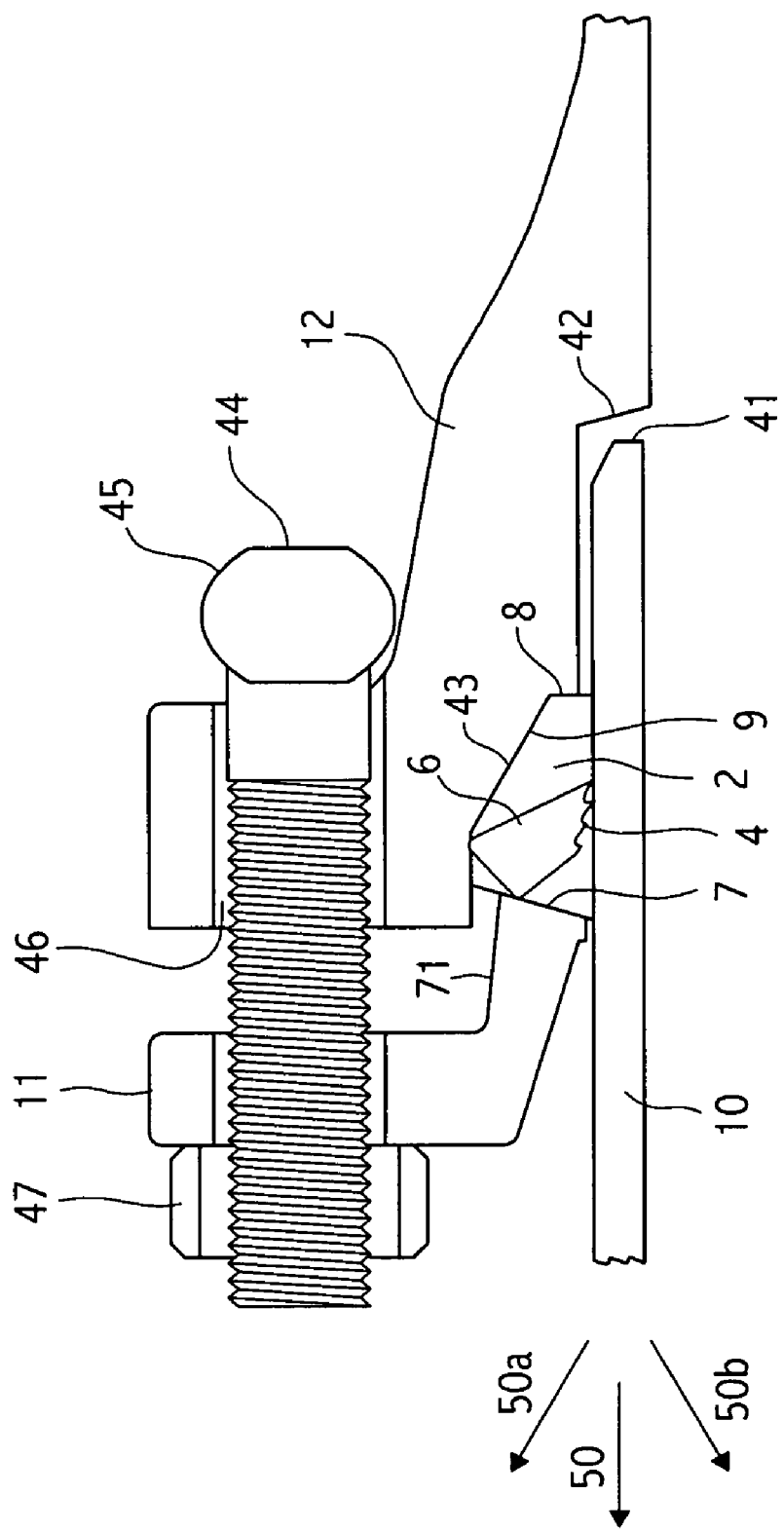
FIG. 4 is a schematic of a mechanical joint incorporating the gasket and locking segment of the current invention.
Figure 5:
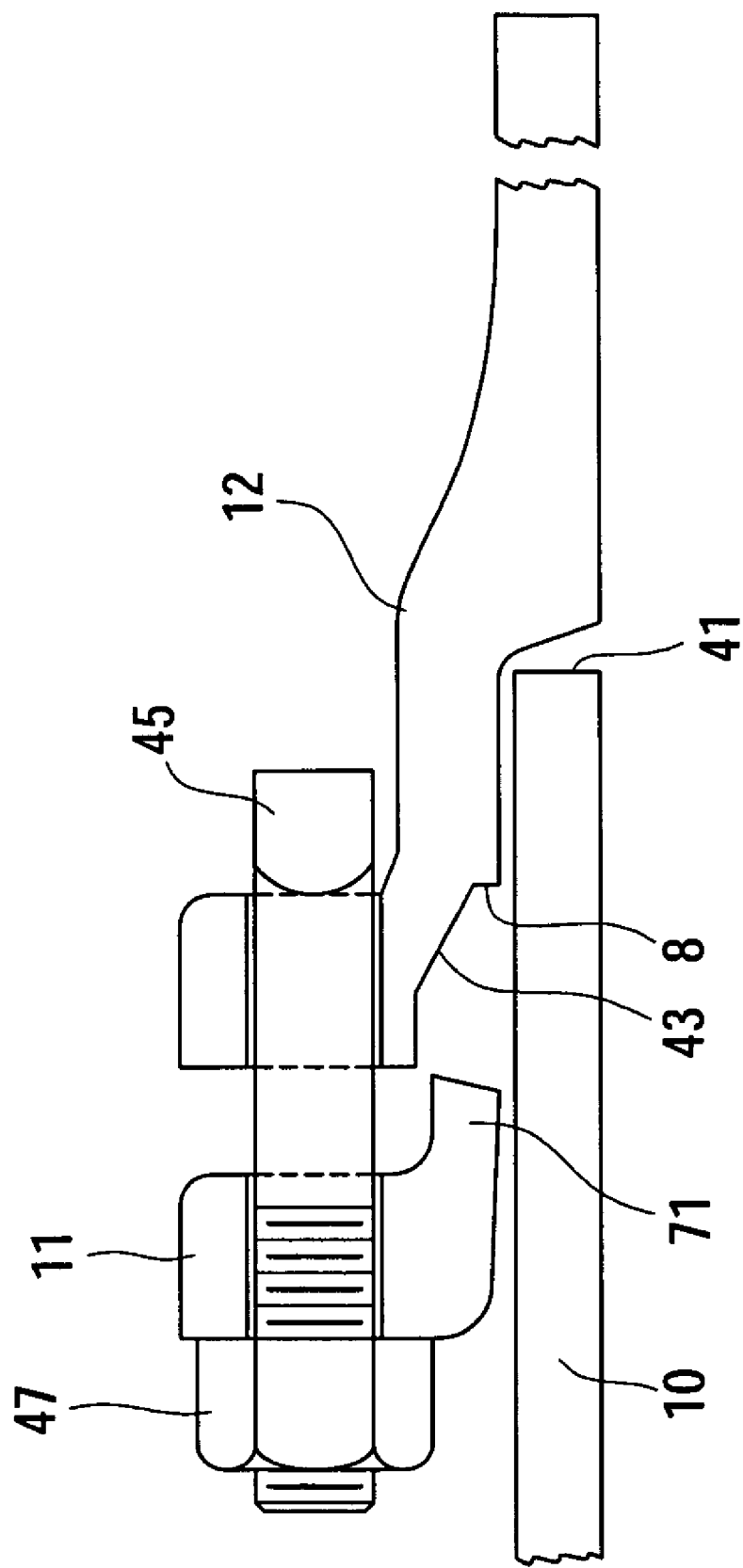
FIG. 5 is a mechanical joint shown without a gasket in place.

As is depicted in FIG. 2, the locking segment 1 of the present invention is optimally constructed to fit within a gasket 2 that is configured to fit within any standard mechanical joint without necessitating changes to the configuration of the bell, gland, or spigot. Gasket 2 is an elastomeric or other resilient or deformable material, such as those in the art will understand may be used in the practice of a mechanical joint. The preferred configuration of the gasket is an annular ring with a radially inner spigot-facing surface 4 that is adapted to be in contact with spigot 10, a gland-facing surface 7, which is adapted to be compressed by a gland or compression ring 11, and a recess-seat facing surface 9 that is adapted to contact the inner surface of bell 12. Although these surfaces are readily distinguishable in the drawings and as discussed herein, it will be apparent that any gasket intended for use in a mechanical joint will have such surfaces; as the gasket is compressed, it will necessarily be compressed by spigot 10, recess seat 43, and gland 11. Accordingly, even an O-ring with circular cross section would possess all three surfaces, though the transition among surfaces may not be as readily apparent in the uncompressed state as in the configuration shown. Most preferably, gasket 2 conforms to all of the requirements of ANSI/AWWA C111/A21.11-95. In particular, for any given spigot 10, gasket 2 tends to have a slightly smaller inner diameter than the outer diameter of the spigot 10. Accordingly, placement of gasket 2 over the exterior of spigot 10 typically will require exertion of force to expand gasket 2 to fit around spigot 10.

Further, the external configuration of gasket 2 is preferably complimentary to the inner configuration of the area of bell 12 into which gasket 2 seats. Gasket 2 incorporates at least one locking segment 1. In the usual practice of the invention, a number of locking segments 1 will be circumferentially dispersed about and within gasket 2, and though preferable, the placement need not be precisely or even nearly symmetrical. The number of such segments 1 may depend upon the expected separative forces to be encountered by the joint, with a higher force tending to recommend a larger number of segments 1. The inventor prefers to use no fewer than three such segments 1, but the invention is not so limited. For example, the most preferred configuration of segments 1 for use with a pipe of eight inch diameter intended to carry fluids at pressures of 350 p.s.i. includes eight to ten segments 1 uniformly spaced around the spigot-facing circumference of gasket 2 (e.g., the radially inner surface 4). An alternative would allow a single segment 1 of a circumference appreciable to (at least one-half the size of) the circumference of gasket 2.

Separative forces (shown diagramatically as vectors 50, 50a and 50b) tend to extract spigot 10 from bell 12. As indicated by directional arrow 50, some separative forces follow in-line with the common axis of assembled pipe lengths. Other separative forces are para-axial, as shown by vectors 50a and 50b, which may be due to bedding shifting or non-uniform securement around the periphery of spigot 10. Segment 1 is intended to grip spigot 10 and to translate separative forces into forces opposing and distributed between gland 11 and bell 12. To this end, segment 1 possesses teeth 6 that are adapted to protrude from inner surface 4 of gasket 2, to at least upon compression of gasket 2 by gland 11. Teeth 6 are adapted to contact spigot 10, and are most preferably fashioned of a substance that is harder than the material comprising the exterior of spigot 10. In a preferred embodiment, teeth 6 are, in the uncompressed state of gasket 2, already exposed from the inner surface 4. This exposure may be by protrusion from the inner surface 4, or by slight recessing beneath inner surface 4 in combination with the absence of gasket material covering the teeth. An alternative preferred embodiment presents teeth 6 slightly recessed within gasket 2, and covered by a membrane or thin layer of compressible or puncturable material, so long as the depth and placement of teeth 6 are adapted to ensure engagement, specifically direct physical contact, between at least one tooth 6 and spigot 10 upon compression of gasket 2. The advantage of such initial concealment is that it allows for greater advancement of gland 11, and thus greater compression of gasket 2, prior to substantial engagement of teeth 6 into spigot 10. A greater sealing effectiveness is therefore allowed.

Preferably, segment 1 possesses a plurality of teeth 6. In the optimal configuration, the tips of teeth 6 are arranged in an arcuate relationship. The arcuate relationship enhances the ability of teeth 6 to bite into spigot 10 despite any variations in circumference of spigot 10 or the inner dimensions of bell 12. This is because a larger gap (frequently due to manufacturing tolerances) between spigot 10 and the inner dimensions of bell 12 (particularly annular gasket recess seat 43) will cause segment 1 in assembly to be rotated upon compression of gasket 2 toward a steeper angle relative to spigot 10 than exists in the unstressed configuration as displayed in FIG. 2. Given the arcuate relationship of teeth 6, upon such rotation of segment 1 the uppermost teeth (such as 6a and 6b) rotate into contact with spigot 10. The arcuate configuration further urges at least two teeth 6 to be in contact with spigot 10, regardless of the rotation of segment 1. This is because in the arcuate configuration, a straight line can be drawn between any two adjacent teeth 6. Beneficially, the presence of additional teeth 6 to either side of any biting tooth 6 tends to assist in preventing overpenetration of the spigot 10 by segment 1, due to the fact that these adjacent teeth will be pointed at an angle to spigot 10 such that they are not optimally positioned for biting; rather, adjacent teeth 6 will tend to contact spigot 10 at an angle substantially more parallel to spigot 10 than those teeth 6 that are biting into spigot 10. Accordingly, because of the substantially parallel angle, adjacent teeth 6 act as stops to further penetration.

In a preferred configuration as detailed in FIG. 2, segment 1 in cross section resembles a truncated, preferably asymmetrical, acute triangle, having a toothed edge 16, with teeth 6 extending therefrom in the arcuate pattern as above discussed; and a back portion 100, which in the shown embodiment has a lower surface 13, extending radially and axially along a slope toward a gland-meeting area 101, which is shown in the figures as a general region in the vicinity of a rear-elbow 3. Rear-elbow 3 is adapted to be in a close proximity to gland 11 when the mechanical joint is assembled. Radially outwardly of both elbow 3 and toothed edge 16, back portion 100 of segment 1 possesses a recess-seat meeting area 102, shown in the drawings as a region with an upper protrusion 17, which together with elbow 3 defines a back surface 14 thereinbetween, and together with the leading tooth 6 of toothed edge 16, defines a frontal slope 15 thereinbetween. In this embodiment, elbow 3 is in close proximity to gland 11 when the joint is assembled, and upper protrusion 17 is in close proximity to annular gasket recess seat 43 of the bell. Most preferably the point of closest proximity between elbow 3 and facing surface 7 is no further from the juncture of recess-meeting surface 9 and facing surface 7 than one half the length of facing surface 7. Furthermore, the inventor prefers that elbow 3 not be immediately adjacent to the juncture of facing surface 7 and spigot 10. A greater volume of elastomeric material of gasket 2 exists between recess-meeting surface 9 (particularly shoulder 8) and segment 1 than is present between elbow 3 and gland 11, or in the area defined by spigot 10, lower surface 13, and elbow 3. Upon compression of gasket 2 by assembly of gland 11 to bell 12, elbow 3 is driven axially inwardly toward bell 12.

Upon insertion of spigot 10 into bell 12, toothed edge 16 of segment 1 is forced radially outwardly by the presence of spigot 10. Such movement is believed to characterize pivoting in the direction counter to directional arrow 60. The volume of compressible material present between frontal slope 15 and gasket recess 43 allows for such outward movement without compromising the integrity of gasket 2. Given the arcuate configuration of teeth 6 along toothed edge 16, even when rotated radially outwardly, at least one tooth 6 will be in contact with spigot 10 (though the inventor recognizes within the spirit of the invention that any or all of teeth 6 may be removed from direct physical contact with spigot 10 due to the presence of a thin layer of elastomeric material, or other substance, so long as the material, or substance is not sufficient to interfere with the effective grip of at least one of teeth 6 into spigot 10 upon full compression of gasket 2, as is described below.) Spigot 10 may be advanced as in the prior art until stopped by annular shoulder 42. Following installation, it will be evident from the foregoing description that at least one tooth 6 remains in gripping contact with spigot 10. Any attempt of the spigot 10 to move outwardly of bell 12 causes at least this one tooth 6 to move axially outwardly of bell 12 along with spigot 10. Such outward movement of at least one tooth 6 will urge the coordinate movement of segment 1. Without limiting the application of the invention, the inventor believes that the following occurs upon such movement of segment 1:

Manufacturing tolerances for spigots and bells are not precise; accordingly, in some installations, the distance between spigot 10 and recess seat 43 will be greater or less than such distance in other installations. Under the above described embodiment of the segment 1, where the gap between spigot 10 and gasket recess seat 43 is as intended or smaller, upon securement of gland 11 the segment 1 is driven into spigot 10 and is pressed with elbow 3 against gland 11 and upper protrusion 17 against bell 12. The inventor believes that due to the supportive pressures of the gasket material, segment 1 does not begin biting engagement with spigot 10 until a generally effective seal among bell 12, spigot 10 and gasket 2 has been effected by compression. Accordingly, teeth 6 are unable to prematurely engage spigot 10 in a manner that may adversely affect the ability to obtain optimal compression of gasket 2. This delayed engagement can be manipulated by the means discussed above; namely, recessing or masking of teeth 6. Due to contact with bell 12 in addition to gland 11, separative forces are transferred by segment 1, not just against gland 11 but also against bell 12. This is significant in that it reduces a potentially substantial force that is resisted by bolts 45. Under high loads, bolts 45 can actually tend to stretch, reducing sealing effectiveness of gasket 2; the current invention's ability to transfer a portion of the magnitude of the separative vector to the bell therefore enhances the effectiveness of sealing.

In contrast to situations as in the previous paragraph, in which the distance between spigot 10 and gasket recess seat 43 is relatively small, an additional pivoting mechanism is believed to occur when the gap is larger, as follows:

Upon initial movement of tooth 6 axially outwardly, segment 1 begins axial movement along the substantially same direction as spigot 10. Given the relatively small amount of elastomeric material between elbow 3 and gland 11 (if any material is present between the two), the axial movement of segment 1 however shortly becomes impeded at the approximate meeting of elbow 3 and gland 11. The inventor believes that subsequent axial outward movement of spigot 10 causes segment 1 to rotate toothed edge 16 toward spigot 10 at a point of pivoting in the vicinity of elbow 3. Such point of pivoting is most likely to occur within a distance from elbow 3 no greater than one half of the distance from elbow 3 to upper protrusion 17. Continued rotation about this pivot point causes teeth 6 closer to recess-meeting surface 9 to rotate into engagement with spigot 10. Because of the angle that exists between elbow 3 and any tooth 6 that is in gripping engagement with spigot 10, as axial outward movement of elbow 3 is prevented by gland 11, elbow 3 is pressured to slide radially outwardly of spigot 10. Such radially outward movement of elbow 3 may itself be impeded by limited stretching and compression of the elastomeric material below and above elbow 3. Movement of elbow 3 in the radially outward direction is finally substantially impeded by upper protrusion 17 approaching resistive contact with annular gasket recess seat 43. It will be understood by those skilled in the art that this entire process of movement of elbow 3 radially outwardly may result in a dynamically changing point of pivoting. The radially outward and axial movement of segment 1 that is believed to occur according to the above described mechanism eventually is halted when upper protrusion 17 and elbow 3 are in substantially non-compressible contact with annular recess 42, and back surface 7, respectively.

In an alternative embodiment of segment 1, elbow 3 and upper protrusion 17 (or either) may be formed in an angular configuration. Such an angular configuration will cause such points to bite into bell 12 when sufficient pressure is exerted between segment 1 and bell 12. Although such biting can occur in any event under appropriately high pressures, particularly in the small-gap situation addressed above, the propensity to bite can be controlled by adjusting the acuteness of the angle. The inventor notes that the more acute the angle at either given point, the earlier along a pressure curve the point will likely bite into bell 12. Accordingly, it is possible to adjust the points of final rotation of segment 1 by adjusting the acuteness of angle of the points, which will in turn adjust the maximum probable radially outward movement of elbow 3 or the axially outward movement of upper protrusion 17. It should be noted that at pressures sufficient to drive both elbow 3 and upper protrusion 17 into bell 12, rotation of segment 1 will be substantially prevented. This mechanism can be employed to set a maximum rotation of segment 1 to prevent an over-rotation that may result in puncture or cracking of spigot 10. Similarly, if elbow 3 is configured with an acute angle and upper protrusion 17 is configured in a radiused fashion, movement of segment 1 may be adjusted to allow radially outward movement of segment 1 until upper protrusion 17 obtains non-compressible abuttment with bell 12, at which point pressures the axial and radial pressure on upper protrusion 17 cause the pivot point to occur in its near vicinity. Upon further rotation, elbow 3 will be urged into increasingly forced contact with bell 12. The acute angle of elbow 3 will then cause biting into bell 12, which in turn will again shift the point of pivoting to the vicinity of elbow 3.

A preferred embodiment will possess a final point of pivoting at elbow 3 when elbow 3 is at a position radially outwardly of spigot 10 such that the angle between the line from elbow 3 to the nearest biting tooth 6 and the longitudinal axis of spigot 10 (or the outward pressing vectors) is between 15 degrees and 75 degrees, more preferably between 25 and 45 degrees. An alternative embodiment would place elbow 3 bitten into bell 12 at the same position, while at the same time encouraging biting of upper protrusion 17 into bell 12. In such a multiple-bite configuration, the separative vectors are believed to be directed in a line from the teeth 6 which have biting contact with spigot 10 after rotation of segment 1 has ceased, which line passes either through back surface 14 or at or above elbow 3, and further pass through bell 12 to achieve transfer of a portion of separative vectors to bell 12.

Figure 6:
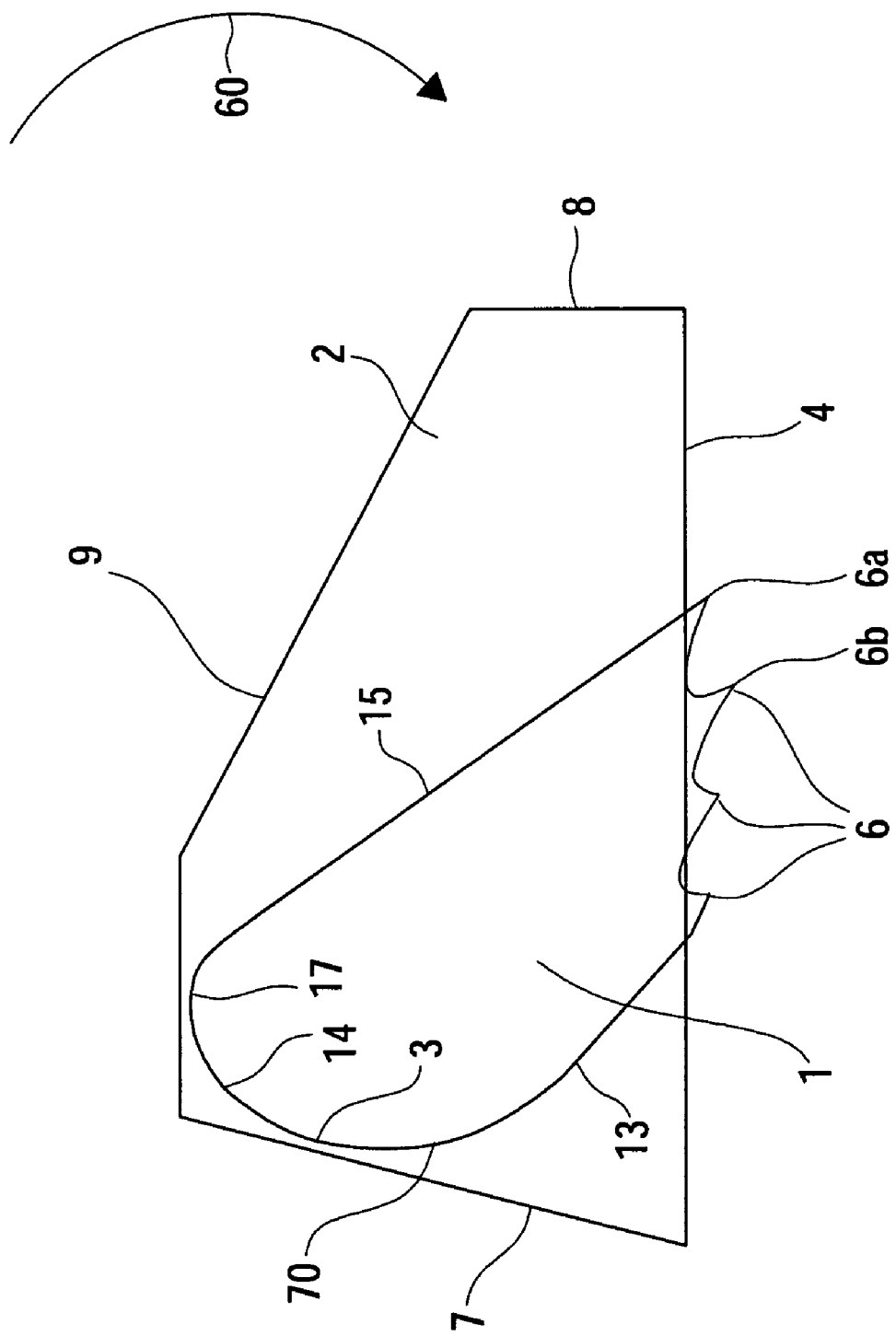
FIG. 6 is an alternative embodiment of the locking segment in a gasket of the current invention, in which the elbow and upper protrusion of the segment reside in a general curve.

Building upon the concept of altering the acuteness of elbow 3 and upper protrusion 17, the transition between such points may be less pronounced than in FIG. 2. In fact, the transition may be so smooth as to create a general curve that acts as both elbow 3 and upper protrusion 17. This configuration is seen in FIG. 6, which demonstrates curve 70 as substituted for, or acting in place of elbow 3 and upper protrusion 17. The inventor most prefers that in such configurations the curve 70 be elliptical. It should be understood that FIG. 6 depicts a large radius of curve 70, to allow for contact of segment 1 with gasket recess seat 43 and with gland 11 at locations removed from the intersection of gland 11 and gasket recess seat 43. The elliptical nature of curve 70 facilitates defining the intended points of contact at different points from such intersection. Accordingly, the substitution of a curve 70 either for one of elbow 3 or upper protrusion 17, or substantially continuous through both points is within the scope of this invention. Thus, references herein to elbow 3 and upper protrusion 17 may be satisfied by a curve 70, except that modification of the curve 70 may be required to the extent that either point is intended to bitingly engage gland 11 or recess 43. Where such engagement is desired, a curve 70, if substituted, could be adapted to effect such engagement, whether by altering the radius of curvature, or by including nubs or other points to operate as engagement points (which, for purposes of this invention could be considered to be elbow 3 or upper protrusion 17).

Figure 7:
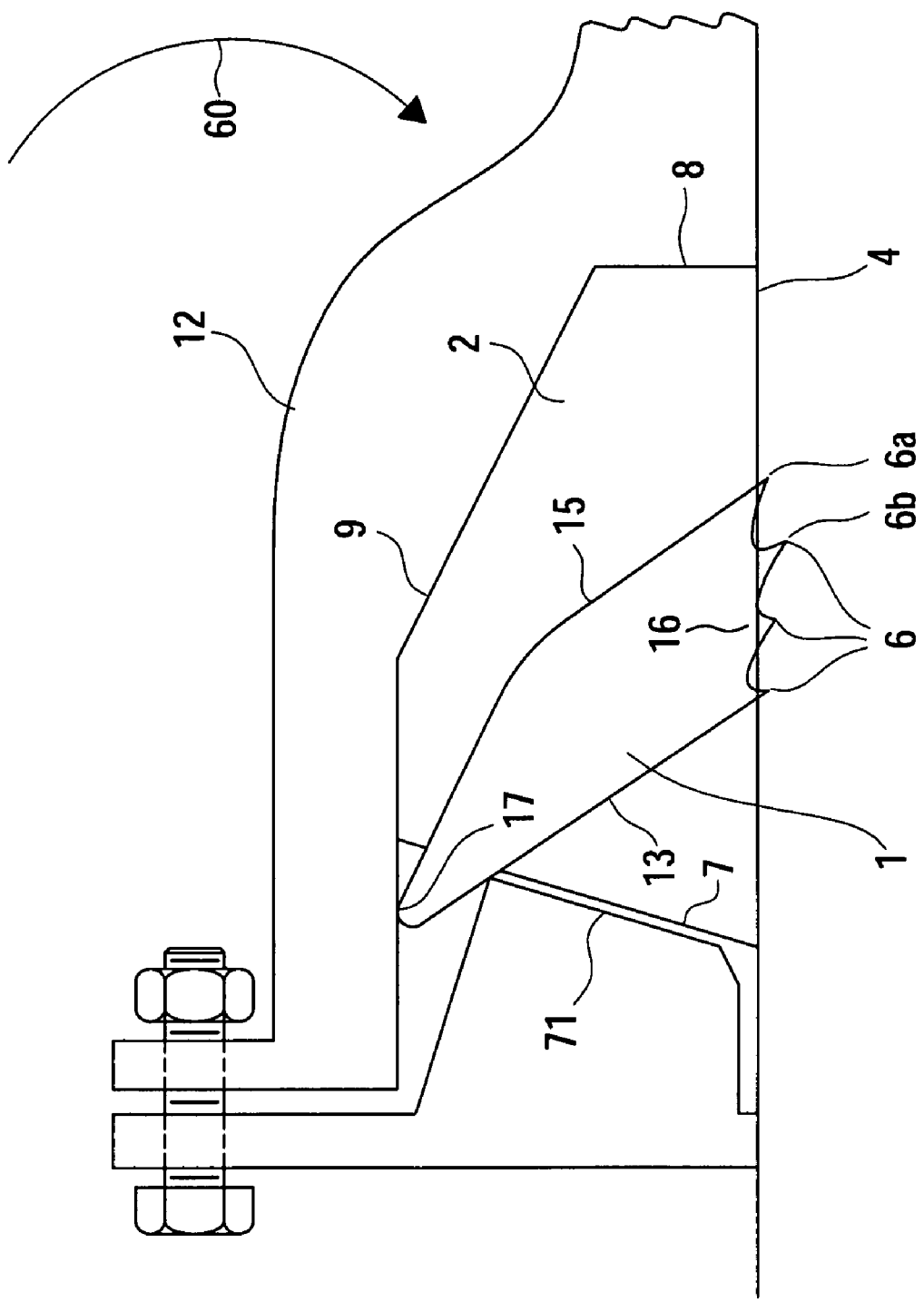
FIG. 7 is an alternate embodiment of the locking segment in a gasket of the current invention, shown in relation to the mechanical joint, in which the protrusion and elbow are adapted to interact with the gap between bell and the gland lip.

Yet another embodiment practices segment 1 as contacting bell 12 and gland 11 near the intersection of gasket recess seat 43 and gland 11. To effect such a close proximity, curve 70 (or elbow 3 and upper protrusion 17) will define a relatively small area that may be termed a back portion 100. Furthermore, the segment 1 may be constructed and positioned in such a manner that this back portion 100 intrudes within any gap that is present at the intersection of gasket recess seat 43 and gland 11 as shown in FIG. 7. The configuration of this area and the manner of intrusion may be orchestrated such that the end of lip 71 of gland 11 acts as a fulcrum, and the intruding portion acts against gasket recess seat 43 to prevent over-rotation of segment 1.

In each of these embodiments, the inventor notes that— whether by curve 70 or discrete points of elbow 3 and upper protrusion 17—segment 1 effectively contacts both gland 11 and recess 43. Such contact may be direct engagement (as in a biting contact) or indirect (as where a fully compressed or non-compressible membrane or member interposes but does not interfere with the movement-resistive effect of gland 11 and recess 43).

Further alternative embodiments that may be included with the foregoing or otherwise include the strategic positioning of a secondary rubber having a different (less compressive) durometer rating than the remainder of gasket 2. Such strategic positioning may optimally include placement between frontal slope 15 of segment 1 in the vicinity of upper protrusion 17. This placement would influence the potential of upper protrusion 17 to move toward annular gasket recess seat 43, thereby causing upper protrusion 17 to cease rotation and become a point of pivoting, without the necessity for biting into bell 12. Similarly, such secondary rubber may be placed radially outwardly of elbow 3 to influence the maximum ability of elbow 3 to move radially outwardly of spigot 10.

Given the potential for variable para-axial pressures to be exerted on spigot 10, the inventor prefers an arrangement having upper protrusion 17 adapted to engage into bell 12, having elbow 3 adapted to resist such engagement, and having a secondary rubber positioned in the vicinity of upper protrusion 17 and annular gasket recess seat 43. This configuration is believed to allow for optimal flexibility of the joint to absorb para-axial pressures and to return to an unstressed state following removal of such para-axial pressure. This capacity aids in preventing ratcheting of the joint in response to variable pressures. Such ratcheting may lead to a joint too rigid to absorb stresses, leading in turn to potential loss of fluid pressure seal.

Although much of the foregoing is discussed in terms of initial installation of a mechanical joint, the inventor notes the value and applicability of use of the present invention to "retrofit" or repair existing mechanical joints. By simply rejoinably severing the ring of gasket 2 (preferably at an angle to the radius) the gasket 2 can be fit over an existing spigot, and moved into place after removal of the old gasket. The gland 11 can then be re-attached, completing retrofitting of a standard mechanical joint to a gasket-restrained mechanical joint.

We claim:

1. A pipe joint comprising a male first pipe portion, a female second pipe portion, a compression gland securable with an externally tightenable fastener to the female second pipe portion, and a restraining gasket, said gasket further comprising:
   a) a deformable body; and
   b) a locking member, at least partially embedded within the deformable body, wherein at least a portion of the locking member is positioned to engage the first pipe portion,
   wherein said locking member is adapted to adopt a position in which (i) the locking member bites into the first pipe portion and the second pipe portion upon compression of the gland against said gasket by the tightening of the fastener; and (ii) said locking member resists movement of said first pipe portion in a direction outward of the second pipe portion by transferring a first portion of an extractive force to said gland and transferring a second portion of such force directly to an interior surface of the second pipe portion, which said first portion and said second portion are each of a magnitude less than the magnitude of the extractive force.

2. A pipe joint as in claim 1, wherein the deformable body of said gasket further comprises a plurality of density regions, wherein said regions are adapted to influence the movement of said locking member.

3. A pipe joint as in claim 1 in which the interior surface of the second pipe portion, to which the second portion of the force is transferred, is disposed substantially parallel to the axis of the second pipe portion.

4. A pipe joint as in claim 1 wherein the externally tightenable fastener comprises a bolt.

5. A restraining gasket for securely joining a male first pipe portion to a female second pipe portion, the latter having a bell tightenably connected by bolts to a compression gland, the gasket placeable in snug engagement with the male first pipe portion, the bell being above the gasket and the compression gland being to the rear of the gasket, wherein the gasket comprises a deformable body and a locking segment configured so that the locking segment engages the first male pipe portion and forms a rear-most angle, which is acute in the extraction direction, between the male first pipe portion and a lower surface of the locking segment, and so that other portions of the locking segment simultaneously engage the bell and the gland at points not adjacent the male first pipe portion.

6. A pipe joint comprising a male first pipe portion, a gasket in contact with an outside of the male first pipe portion and also in contact with an internal surface of a female second pipe portion, a locking segment within the gasket that is in contact with both the male first pipe portion and the female second pipe portion, and a compression gland about the male first pipe portion that has an inner diameter greater than an outer diameter of the male pipe portion, wherein said locking member is adapted to adopt a position in which the locking member bites into the male first pipe portion and the female second pipe portion upon movement of the gland toward the female second pipe portion.

7. A pipe joint as in claim 6, wherein the locking segment directly contacts the compression gland at a location that is closer to the female pipe portion than to the male first pipe portion.

* * * * *